Nov. 11, 1952 H. A. ETHERIDGE, JR 2,617,855

AUTOMATIC MEASUREMENT OF TRANSMISSION CHARACTERISTICS

Filed Nov. 10, 1950 2 SHEETS—SHEET 1

INVENTOR
H. A. ETHERIDGE JR.
BY H. A. Burgess
ATTORNEY

INVENTOR
H. A. ETHERIDGE JR
BY H. A. Burgess
ATTORNEY

Patented Nov. 11, 1952 2,617,855

UNITED STATES PATENT OFFICE 2,617,855

AUTOMATIC MEASUREMENT OF TRANSMISSION CHARACTERISTICS

Harry A. Etheridge, Jr., New York, N. Y., assignor to Bell Telephone Laboratories, Incorporated, New York, N. Y., a corporation of New York Application November 10, 1950, Serial No. 195,032

7 Claims. (Cl. 175—183)

This invention relates to methods of and apparatus for automatically measuring the transmission characteristics of electrical transmission systems. The invention provides for the automatic measurement of envelope delay distortion characteristic and of phase distortion characteristic independently of or simultaneously with measurement of gain distortion.

The expressions gain distortion, envelope delay distortion and phase distortion, as used herein, refer to the departure from the gain (or loss), delay and phase slope, respectively, of the transmission system at an arbitrarily selected frequency in its transmission frequency range to which the gain, delay or phase shift at all other frequencies are compared.

The ideal transmission system exhibits over its transmission frequency range uniform gain (or loss), uniform delay and linear change of phase. Due to physical limitations the actual transmission characteristics thereof depart considerably from the ideal. Stringent requirements are imposed on high quality telephone and television transmission circuits, and it is essential that the transmission characteristics of such circuits closely approximate the ideal. Corrective apparatus may be inserted in the system to compensate for the distortion phenomena exhibited thereby, but before such compensation can be provided, it is, of course, necessary that the amount of distortion be known.

Accordingly, it is an object of this invention to provide a direct method of and apparatus for automatically measuring and recording the gain distortion, envelope delay distortion and phase distortion characteristics of electrical transmission systems, and specifically, for making such measurements simultaneously.

Another object is to provide a novel method of and apparatus for automatically measuring and recording the phase distortion characteristic of an electrical transmission system. In the present invention the same test signal, viz. a double sideband suppressed carrier signal, is used for directly measuring and recording not only the delay distortion but also the gain and phase distortion characteristics of a transmission system. These items are measured automatically and recorded simultaneously, or separately if desired, in the space of a few minutes, with a gain in accuracy and a saving in time.

In accordance with the invention the gain distortion characteristic of a transmission circuit, such as a transmission line for example, is obtained by applying a double-sideband suppressed carrier test signal at constant level to the input terminals of the transmission circuit. The frequency position of the test signal is slowly varied over the frequency range of the transmission circuit, and at the opposite end of the transmission circuit the test signal is demodulated to recover a signal, hereinafter called the interval frequency signal, corresponding to the frequency separation between the upper and lower sidebands of the modulated test signal. The recovered interval frequency signal is then rectified to obtain its amplitude variations and the rectified signal is opposed with a constant direct-current potential the magnitude of which is proportional to the absolute gain of the circuit at an arbitrarily selected frequency in the transmission frequency range.

For envelope delay distortion measurements a reference signal, simply related in frequency to the low frequency modulating component of the test signal and derived from the same frequency source, is applied to the transmission circuit together with the test signal. The test signal is demodulated at the opposite end of the transmission circuit to obtain the interval frequency thereof. The phase of the interval frequency signal is then compared to that of the reference signal. The phase of the reference signal is adjusted to produce a null comparison with the recovered interval frequency signal at an arbitrarily selected frequency. The departures from the null comparison will thus be a direct measure of the delay distortion characteristic of the transmission circuit.

For phase distortion measurements a servo control unit the subject-matter of copending patent application Serial No. 195,075, filed November 10, 1950, in the name of T. Slonczewski, is employed to cause the mean frequency of the modulated test signal to vary at a constant time rate of change over the entire transmission frequency range of the circuit under test. The envelope delay distortion, derived as described above, is then integrated electronically with respect to time to obtain a direct measure of the phase distortion characteristic of the transmission circuit.

The nature of the present invention and other objects, features and advantages thereof will be apparent from a consideration of the following detailed description and drawings:

Fig. 1 illustrates the ideal transmission characteristics of a transmission circuit;

Figs. 2, 3, and 4 illustrate the absolute gain, phase and delay characteristics, respectively, that are actually exhibited by typical transmission circuits;

Figure 1:
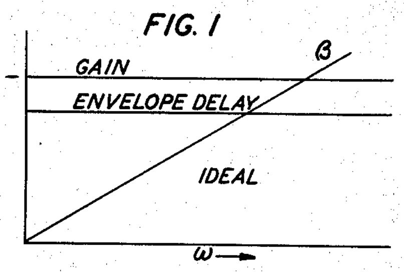
Fig. 1 illustrates the gain, delay and phase shift characteristics of an ideal transmission system which exhibits over its transmission frequency range uniform gain and delay and linear change of phase.
Figure 2:
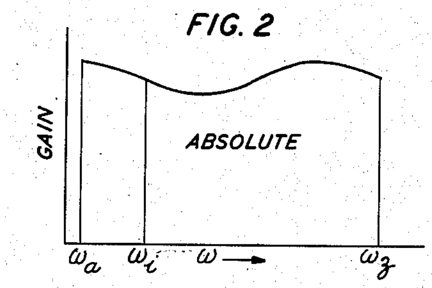
Figure 3:
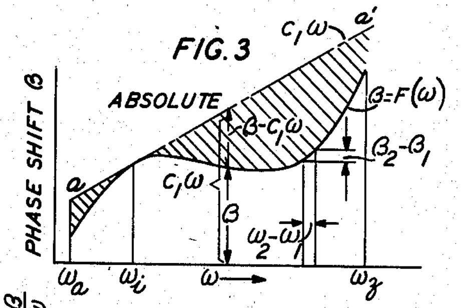
Figure 4:
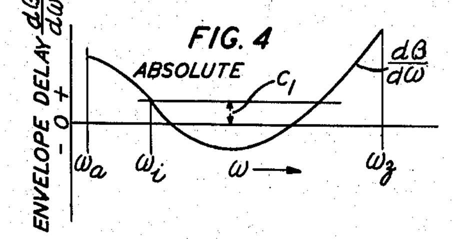

Figs. 2, 3 and 4 illustrate typical absolute gain, phase shift and envelope delay characteristics, respectively, of an actual transmission system. The envelope delay characteristic of Fig. 4 represents the slope, at all points of the phase shift characteristic of Fig. 3. The phase shift versus frequency characteristic of Fig. 3 may be represented mathematically by the expression $$\beta = F(\omega) \qquad (1)$$

where $\beta$ is the phase shift measured in radians and $\omega$ the angular frequency.

Envelope delay is defined as the first derivative of the phase shift versus frequency characteristic and may be determined by measuring the phase change at two frequencies $f_1$, $f_2$ taken a short interval apart and determining therefrom $$\frac{d\beta}{d\omega} = \frac{dB}{df} = \frac{1}{360} \cdot \frac{d\theta}{df} = \frac{1}{360} \cdot \left(\frac{\theta_2 - \theta_1}{f_2 - f_1}\right) \qquad (2)$$

where $\beta$, B and $\theta$ are the phase shift expressed in radians, cycles and degrees, respectively, $\omega$ and $f$ the frequency in radians and cycles, respectively, and $(\theta_2 - \theta_1)$ the difference in degrees phase shift corresponding to the frequency interval $(f_2 - f_1)$.

Figure 5:
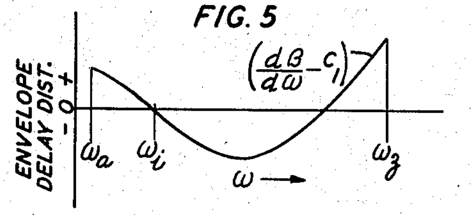
Figs. 5, 6 and 7 illustrate the delay distortion, phase distortion and gain distortion characteristics, respectively of the transmission circuit whose absolute gain, phase and delay characteristics are represented by Figs. 2, 3, and 4.

Fig. 5 illustrates the envelope delay distortion characteristic of the subject transmission system and is a measure of delay departures from the absolute delay of the system at an arbitrarily chosen frequency, $\omega i$, in its transmission frequency range to which all other values of delay at different frequencies are referred. The delay distortion characteristic of Fig. 5 is essentially the absolute delay characteristic of Fig. 4 with the absolute delay of the system at the arbitrarily chosen frequency, $\omega i$, subtracted at all points therefrom and may be expressed by the equation $$\text{E. D. D.} = \frac{d\beta}{d\omega} - C1 \qquad (3)$$

where the constant C1 represents the absolute envelope delay at the frequency $\omega i$.

Since the ideal delay characteristic of any system need only be a straight horizontal line, the absolute magnitude of the delay is not of primary concern, and so long as the system exhibits a uniform delay characteristic it is immaterial what frequency in the transmission frequency range is selected for purposes of delay departure comparison.

Figure 6:
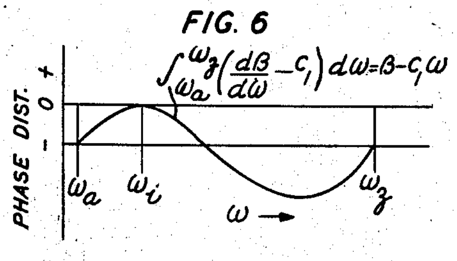

Fig. 6 illustrates the phase distortion characteristic which, in accordance with the invention, is obtained by integrating the envelope delay distortion characteristic of Fig. 5 over the transmission frequency range $\omega_a$ to $\omega_z$ and represents phase departures of the phase shift characteristic of Fig. 3 from a linear phase slope taken at the arbitrarily selected frequency $\omega i$. The results of the integration may be expressed mathematically as $$\text{Phase Dist.} = \int_{\omega_a}^{\omega_z} \left(\frac{d\beta}{d\omega} - C_1\right) d\omega = \beta - C_1\omega \qquad (4)$$

where the term $\beta = F(\omega)$ as in Equation 1, and the term $C_1\omega$ is the straight line tangent to the phase shift characteristic $\beta = F(\omega)$ of Fig. 3 at the arbitrarily selected frequency $\omega i$. The difference between the ordinates of the phase shift characteristic, $\beta = F(\omega)$, and that of the sloping straight line, $C_1\omega$, of Fig. 3 at any frequency is a direct measure of the phase distortion or phase departure, $\beta - C_1\omega$, of the system, and this difference is readily seen to be the magnitude at all points of the phase distortion characteristic of Fig. 6. In other words the curve of Fig. 6 is the same as the curve of Fig. 3 if the line $a$—$a'$ is made horizontal, obtained by subtracting the slope of $a$—$a'$, which operation is the equivalent of setting an arbitrary zero.

Figure 7:
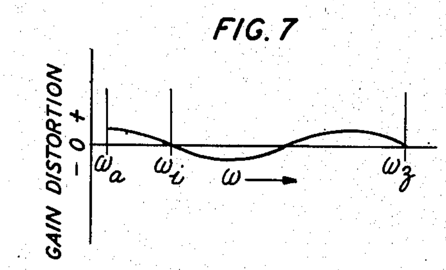

Fig. 7 illustrates the gain distortion characteristic of the subject transmission system as measured and recorded by the present invention and is a plot of gain departures from the absolute gain of the system taken at an arbitrarily selected frequency $\omega i$.

Figure 8:
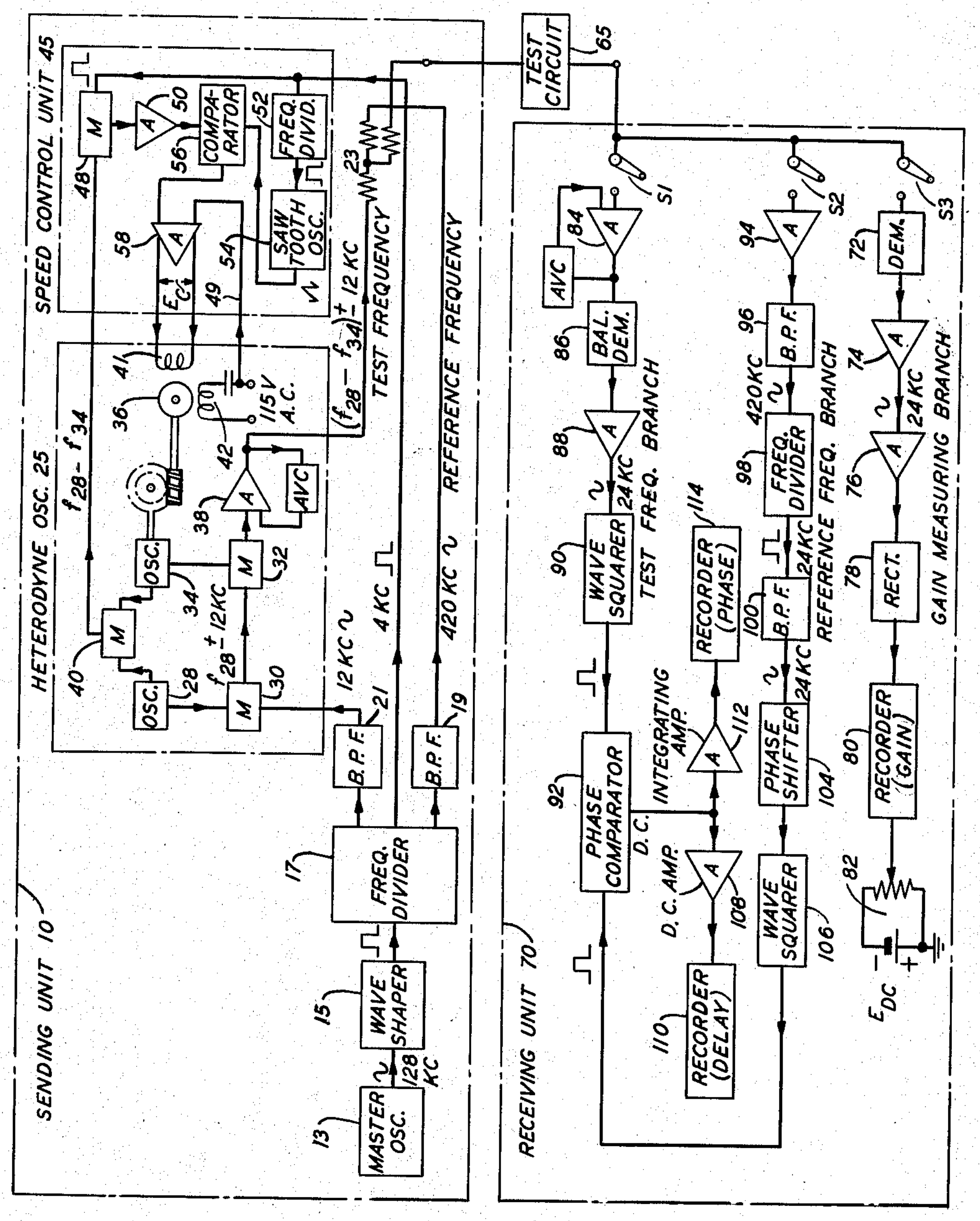
Fig. 8 illustrates in block diagrammatic form an embodiment of the invention adapted for simultaneous or separate measurements of the gain distortion, envelope delay distortion and phase distortion characteristic of transmission circuits.

Fig. 8 illustrates in block diagrammatic form an embodiment of the invention adapted for simultaneous or separate measurements of gain distortion, envelope delay distortion and phase distortion.

The measuring apparatus consists of a sending unit, the components of which are shown enclosed by the dash-dot line 10, and a receiving unit similarly enclosed by dash-dot line 70. For straight-away field measurements the sending and receiving units are located at opposite ends of the transmission circuit 65 under test. Where both ends of the test circuit are available at the same location, as for loop measurements, the sending and receiving units will have a common location.

For the purpose of setting forth a complete disclosure it will be assumed that line 65 is a 75-ohm coaxial cable that operates over a transmission frequency range $\omega_a$ to $\omega_z$ of, say, 50 kilocycles to 3500 kilocycles. Such a transmission circuit exhibits a high degree of phase stability at a frequency of 420 kilocycles, and accordingly this value was selected as the reference signal frequency for delay and phase distortion measurements. Faithful reproduction of the measured distortion characteristics can be obtained with an interval frequency $(f_2 - f_1)$ of 24 kilocycles, though where fine structure distortion is to be recorded a narrower frequency interval, 4 kilocycles for example, may be utilized. For a 24-kilocycle frequency interval the low frequency modulating signal component of the modulated test signal will be 12 kilocycles or $$\frac{f_2 - f_1}{2}$$

The 12-kilocycle modulating component of the test signal and the 420-kilocycle reference frequency signal are derived by a process of frequency division and selection at the sending unit 10 of Fig. 8 from a highly stable and accurate crystal-controlled frequency substandard or master oscillator 13 that generates, say, a 128-kilocycle sinusoidal output. The output of 13 is applied to a wave shaper 15 which may be a conventional clipping amplifier that functions to transform the incoming 128-kilocycle sine wave into a square wave the leading edges of which are critically spaced in time. Wave shaper 15 is followed by a frequency divider 17 consisting of well-known blocking oscillator counting circuits arranged to provide critically spaced 4-kilocycle wave "spikes" at its output. Band-pass filters 19 and 21, connected in parallel to the output of circuit 17, are tuned to the third and 105th harmonic, respectively, of the 4-kilocycle submultiple of the master oscillator frequency, thereby selecting the 12-kilocycle low frequency modulating component of the test signal and the 420-kilocycle reference frequency signal. Filter 19 is connected directly to one arm of a Y-connected resistance combining pad 23 through which the reference frequency and the modulated test signal are applied to the terminals of the transmission circuit 65 under test.

The modulated test signal is derived by a double modulation process in heterodyne oscillator 25 wherein the 12-kilocycle sinusoidal signal from filter 21 modulates the output, $f_{28}$, of fixed frequency oscillator 28 in an ordinary narrow-band balanced modulator 30. The resulting suppressed-carrier double-sideband signals, viz., $f_{28}\pm12$ kilocycles, from 30 are then modulated in a conventional broad-band balanced modulator 32 with the output from variable oscillator 34. The frequency $f_{34}$ of oscillator 34 is slowly varied by a two-phase variable-speed induction motor drive 36 over frequency limits that differ from $f_{28}$ by the absolute value of $\omega_a$ and $\omega_z$. For a transmission frequency range of 50 kilocycles to 3500 kilocycles and a fixed oscillator frequency $f_{28}$ equal to 90 megacycles, for example, $f_{34}$ may vary from 89.95 to 86.5 megacycles.

The output of 32, $(f_{28}\pm12$ kc.$)\pm f_{34}$, is connected to an amplifier 38 which is tuned to pass only the lower sideband, viz. $(f_{28}-f_{34})\pm12$ kilocycles, resulting from the last modulation process in heterodyne oscillator 25. Amplifier 38 is provided with stiff AVC circuits to maintain at constant level the modulated test signal which is applied from the output of 25 to the terminals of the transmission circuit 65 through resistance combining pad 23.

Figure 9A:
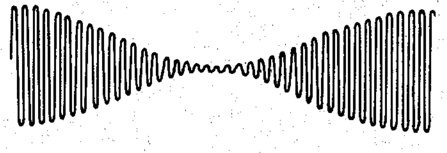
Fig. 9 shows two wave forms to be referred to in the description of the method and apparatus of the invention.
Figure 9B:
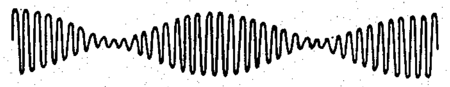

The envelope of the modulated test signal derived at the sending end of Fig. 8 is composed of two frequency components which are located $$\frac{f_2-f_1}{2}$$

or 12 kilocycles above and below the instantaneous frequency, $f_{28}-f_{34}$, of the heterodyne oscillator 25 the wave form of these components being substantially as illustrated in Fig. 9A. Detection of these components of the test signal at the receiving end of the measuring apparatus recovers the interval frequency $(f_2-f_1)$ as will be readily seen from the envelope of Fig. 9B which represents the superposed component frequencies whose resultant envelope frequency is 24 kilocycles.

The oscillator drive speed control unit 45 located at the sending end 70 of the transmission measuring set of Fig. 8 is utilized primarily for phase distortion measurements but could be used also to provide a linear frequency scale for separate measurements of gain or envelope delay distortion. This unit is essentially a sampling type servo control system to cause the frequency of heterodyne oscillator 25 to vary at a constant time rate of change by automatically regulating the speed of motor drive 36. Details of the control unit, additional to those set forth below, may be found in copending patent application of T. Slonczewski mentioned hereinabove.

Broadly, the oscillator drive speed control unit 45 comprises an ordinary balanced modulator 48 whose output feeds a 1000-cycle tuned amplifier 50, and a frequency divider 52 fed from frequency divider 17 and followed by a saw-tooth oscillator 54 and a comparator circuit 56. The two inputs of 56 are supplied from 50 and 54 and its output is connected to a power amplifier 58 that includes a variable gain stage. The comparator circuit 56 may be a keyed modulator of the type illustrated at page 399 of the article "High Performance Demodulators for Servo-Mechanisms" by K. E. Schreiner appearing in the Proceedings of the National Electronics Conference, vol. 2, 1946.

A part of the output of each of oscillators 28 and 34 is intermodulated in modulator 40, contained in heterodyne oscillator 25, and the resulting variable frequency difference signal, $f_{28}-f_{34}$, is applied to modulator 48 together with accurately recurring 4-kilocycle pulses from 17. The frequency spectrum of any of the individual pulses from 17 includes all of the harmonics of 4 kilocycles up to and extending beyond the operating frequency range of 25. Only those modulation products having a frequency equal to 1000 cycles resulting from intermodulation of the 4 kilocycle and its harmonics with the progressively varying frequency output from 40 are passed by the amplifier 50. At the output of 50 there will appear a series of marker frequency pulses equally spaced 2 kilocycles apart during the frequency progression of 25, as explained more fully in the above-referred Slonczewski application. An accurately recurring saw-tooth pacing voltage wave is derived from the 4-kilocycle pulses from 17 by a process of frequency division in 52. The output of 52 supplies 6.25-cycle pulses to 54 which generates saw-tooth oscillations of the same frequency.

The frequency of the saw-tooth pacing wave is determined by the desired time rate of oscillator frequency change, which in the present embodiment is selected as 12.5 kilocycles per second, divided by the frequency spacing between the marker frequency pulses, i. e., 2 kilocycles.

The occurrence in time of the marker frequency pulses from 50 is compared with that of the average value, for example of the saw-tooth pacing voltage wave and a control voltage proportional to the time difference therebetween, is supplied from 56 to the power amplifier 58. The output of 58 is connected to one of the phase windings 41 of the two-phase induction motor 36 which is mechanically geared to the variable oscillator 34 and supplies thereto a control voltage $E_c$ the magnitude of which is such as to cause the speed of 36 to decrease or increase depending on whether the frequency of 34 is above or below the desired linear time rate of frequency change. The other phase 42 of 36 is supplied from a local 115-volt 60-cycle alternating-current source. Sixty-cycle voltage is supplied to the input of amplifier 58 over load 49 from the local 60-cycle power source.

The receiving unit 70 of the measuring apparatus of Fig. 8 includes three parallel measuring branches identified as a gain measuring branch, test frequency branch and a reference frequency branch.

The gain measuring branch comprises a tandem combination of a demodulator 72 which may be an ordinary square law detector for recovering the 24-kilocycle superposed envelope frequency of the modulated test signal, an amplifier 74 tuned to 24 kilocycles, a conventional logarithmic amplifier 76, a rectifier 78, a graphical recorder 80 and an adjustable potentiometer arrangement 82 that includes a local source of direct-current potential $E_{DC}$. Switches $S_1$, $S_2$ and $S_3$ shown in the various branches of the apparatus of Fig. 8 serve to disable any of the branches to afford separate measurements of any of the transmission quantities described herein.

Direct measurement of gain departures is made through use of the potentiometer arrangement which supplies to recorder 80 a steady local direct-current potential of opposite polarity to the direct-current output from rectifier 78. At some arbitrarily chosen frequency, $\omega i$, in the transmission frequency spectrum the potentiometer 82 is adjusted to make the local direct current equal in magnitude to the output of 78, thus producing an arbitrary zero to which all other measured gain values are compared. As the modulated test signal is swept over the transmission frequency band, departures from this arbitrary zero will be recorded on the chart of the recorder 80 at the receiving end as illustrated at Fig. 7. Since the AVC amplifier 38 at the sending end maintains the transmitted power constant over the frequency band, departures recorded on the chart represent departures in transmission from the chosen zero point of the transmission characteristic being measured. Logarithmic amplifier 76 serves to translate uniform amplitude variations of the recovered 24-kilocycle envelope frequency signal expressed in decibels into a uniform output voltage expressed in linear units, thereby providing a linear recording system.

The test frequency branch of the receiving unit of Fig. 8 includes in the relative order named a conventional high frequency amplifier 84 provided with stiff AVC circuits to maintain the incoming signal at constant level, a balanced demodulator 86 preferably of the type described in copending patent application of E. J. Drazey Serial No. 195,020, filed November 10, 1950, now Patent No. 2,602,919 dated July 8, 1952, a 24-kilocycle tuned amplifier 88, and a wave squarer 90 which may be an ordinary clipping amplifier that furnishes a square wave output to one of the two inputs of a phase comparator 92. Suitable phase comparator circuits for use herein are described in the article "Phase Dectectors—Some Theoretical and Practical Aspects" by L. I. Farren appearing in Wireless Engineer, pages 330 through 340, December, 1946.

The reference frequency branch includes in the relative order named a tuned amplifier 94 and a band-pass filter 96 each tuned to pass the 420-kilocycle reference frequency, a frequency divider 98 composed of conventional blocking oscillator counting circuits arranged to provide a 24-kilocycle square wave output, a band-pass filter 100 that passes only the 24-kilocycle fundamental of the incoming square wave, a manually adjustable phase shifter 104 and a wave squarer 106 that supplies a square wave to the other of the inputs of 92. The direct-current output of 92 is supplied over two paths, one including a direct-current amplifier 108 and a graphical recorder 110 for envelope delay distortion measurements, and the other path including an integrating amplifier 112 and a graphical recorder 114 for phase distortion measurements.

In the test frequency branch of the receiving unit 70 of the measuring apparatus of Fig. 8 the incoming modulated test signal is amplified and supplied at constant level to the demodulator 86. From this demodulation there is recovered the envelope of the superposed components of the test signal. The envelope signal is equal to the interval frequency $(f_2-f_1)$ or 24 kilocycles and is fixed in frequency for the remainder of the measuring process notwithstanding the frequency progression of oscillator 25 over its operating frequency range. The phase of the recovered envelope signal corresponds to the difference in phase shift $(\theta_2-\theta_1)$, defined hereinabove.

The reference frequency signal, also transmitted over the transmission circuit 65, is utilized for phase comparison purposes. In the reference frequency branch of the receiving unit a 24-kilocycle signal is derived from the incoming 420-kilocycle reference signal by a process of frequency division in frequency-divider 98. The wave form of the subdivided reference frequency signal and recovered envelope frequency signal are modified by wave squares 106 and 90, respectively, which supply square wave inputs to the phase comparator 92. The direct-current output of 92 is a function of the phase relation of the two inputs thereto. To obtain a measure of delay departures the phase shifter 104 in the reference frequency input to 92 is adjusted to produce at an arbitrarily selected frequency in the transmission frequency spectrum a quadrature phase relationship between the two inputs to 92. An arbitrary zero delay setting is produced by opposing the resulting direct-current potential with one of opposite polarity and equal magnitude. Subsequent phase departures from the reference quandrature relation produce plus or minus changes, according tot he sense of departure, in the output voltage of 92 and may be recorded graphically to obtain a record of the envelope delay distortion characteristic illustrated at Fig. 5.

Departures from phase linearity are measured by integrating the envelope delay distortion information appearing at the output of 92 in the integrating amplifier 112. This amplifier is a high gain direct-current amplifier with capacitance feedback and has the property that its output voltage is proportional to the time integral of the input voltage. Since the incoming voltage to the integrating amplifier 112 from 92 is proportional to the delay distortion, the output voltage of 112 is proportional at any instant to the phase departure from an arbitrary linear phase slope as indicated at Fig. 6. Integrating amplifiers suitable for use at 112 are well known in the art, an example being given in an article published in Proceedings of Institute of Radio Engineers, May 1947, pages 444 through 452 (volume 35, No. 5).

The purpose of the speed control unit 45 may be readily seen in connection with the above. Since phase distortion is obtained by integrating envelope delay distortion, the latter item being a function of frequency $db/d\omega$, the integration should be accomplished with respect to frequency. However, the automatic integrating means, amplifier 112, employed herein integrate with respect to time. The integration could be performed if the frequency of 25 varied at a constant time rate of change. A constant time rate of frequency change could be obtained from an oscillator having a sufficiently linear frequency scale by mechanically driving the oscillator with a synchronous motor energized from a constant frequency supply. However, it is impractical to construct a wide range oscillator with such a degree of scale linearity over its entire operating frequency range. Instead, the required linearity is achieved herein by automatically regulating the speed of the oscillator drive. Provision of a linear time rate of frequency change in this manner thus enables the phase distortion characteristic to be obtained directly and automatically from the envelope delay distortion information by electronically integrating the latter with respect to time.

It is to be understood that the above-described arrangements are illustrative of the application of the principles of the invention. Numerous other arrangements may be devised by those skilled in the art without departing from the spirit and scope of the invention.

What is claimed is:

1. A system for automatically measuring the envelope delay distortion characteristic of an electrical transducer over a given transmission frequency range comprising means for transmitting through said transducer a double-sideband suppressed-carrier test signal, means for sweeping the mean frequency of said test signal over said range, means for transmitting through said transducer another wave having a fixed frequency the same as that of the modulating component of the test signal, means for demodulating said test signal, means for comparing the phase of current obtained from such demodulation against the received current of fixed frequency to obtain a varying direct current, and a meter giving a response proportionate to said direct current, said response plotted over one complete sweep of said test signal being a direct measure of the envelope distortion characteristic of said transducer.

2. A system for measuring the envelope delay distortion of an electrical transducer, comprising means to generate a swept frequency wave covering the frequency range thereof, means to modulate said wave by a comparatively low frequency wave, said modulating means suppressing the unmodulated component of the swept frequency wave, means to transmit the resulting two sidebands through said transducer along with another wave of fixed frequency equal to said low frequency, means to demodulate the received modulated wave to recover the modulating component having said low frequency, means to compare the phase of said recovered wave with that of the received fixed frequency wave, said last means comprising a phase comparator having a varying direct-current output, and means to measure said last-mentioned current at each value of the swept frequency to obtain a measure of the delay distortion characteristic of said transducer.

3. A system for automatically measuring the phase distortion characteristic of an electrical transducer over its transmission frequency range including means for transmitting through said transducer a double-sideband suppressed-carrier test signal, means to vary the mean frequency of said test signal at a constant time rate of change over the transmission frequency range of said transducer, means for measuring the envelope delay of said test signal over said transmission frequency range relative to the delay of said transducer at an arbitrarily selected frequency in said transmission frequency range to obtain the envelope delay distortion characteristic of said transducer and electronic means for integrating as to time the envelope delay distortion of said test signal over said transmission frequency range.

4. A system for automatically measuring the phase distortion characteristic of an electrical transducer over its transmission frequency range, including means for generating a wave of standard frequency, means for producing a double-sideband suppressed-carrier test signal the difference frequency between the sidebands of which is controlled by said standard frequency, means for varying the frequency position of said test signal over said transmission frequency range at a constant time rate of progression, means for deriving a fixed reference frequency signal from said standard frequency wave, means for transmitting said test signal through said transducer, means for deriving from said test and reference frequency signals the envelope delay characteristic of said transducer referred to the delay of said transducer at an arbitrarily selected frequency in said transmission frequency range to obtain the envelope delay distortion characteristic of said transducer and electronic means for integrating as to time the envelope delay distortion characteristic over said transmission frequency range.

5. A system for automatically measuring the phase distortion characteristic of an electrical transmission system over its transmission frequency range, including means for generating a wave of standard frequency, means for producing a double-sideband suppressed-carrier test signal the difference frequency between the sidebands of which is controlled by said standard frequency, means for varying the frequency position of said test signal over said transmission frequency range at a constant time rate of progression, means for deriving a fixed reference frequency signal from said standard frequency wave, means for transmitting said test and reference frequency signals through said transmission system, means for demodulating said transmitted test signal to obtain the difference frequency between the sidebands thereof, means for subdividing the frequency of said transmitted reference frequency signal to equal the difference frequency between the sidebands of said test signal, means for adjusting the phase relationship between said demodulated test signal and said subdivided reference frequency signal to obtain a null phase comparison therebetween at an arbitrarily selected frequency in said transmission frequency range, means for comparing the phase relationship between said last-mentioned signals at each frequency of said test signal as the latter is varied over said transmission frequency range and means for integrating with time the results of said comparison over said transmission frequency range.

6. A system for measuring the phase distortion characteristic of an electrical transducer over a given frequency range, comprising means to generate a swept frequency wave covering said range at a linear rate of sweep, means for modulating said wave by a comparatively low frequency modulating wave, said modulating means including means to suppress the unmodulated component of the swept frequency wave, means to transmit the resulting two sidebands through said transducer, means to transmit a reference frequency wave of constant frequency through said transducer, means to receive said two sidebands and said reference frequency wave, means to measure the envelope delay of said modulated wave relative to the delay of said transducer at an arbitrarily selected frequency, means to determine the variation of the measured envelope delay with frequency, and means to indicate the time integral of the said variations.

7. The system according to claim 6 including means simultaneously operative for demodulating said sidebands to derive their difference-frequency component and means to indicate the variation of the strength of such component as a measure of the gain-frequency characteristic of said transducer.

HARRY A. ETHERIDGE, JR.

REFERENCES CITED

The following references are of record in the file of this patent:

UNITED STATES PATENTS

| Number | Name | Date |
|---|---|---|
| 1,645,618 | Nyquist | Oct. 18, 1927 |
| 2,285,038 | Loughlin | June 2, 1942 |
| 2,401,411 | Carlisle, Jr., et al. | June 4, 1946 |